(12) United States Patent
Rimmelspacher et al.

(10) Patent No.: US 10,434,831 B2
(45) Date of Patent: Oct. 8, 2019

(54) TRAILER COUPLING DEVICE FOR MOTOR VEHICLES

(71) Applicant: Scambia Holdings Cyprus Limited, Limassol (CY)

(72) Inventors: Bernhard Rimmelspacher, Rheinstetten (DE); Aleksej Kadnikov, Leonberg (DE); Wolfgang Gentner, Steinheim (DE)

(73) Assignee: Bosal ACPS Holding 2 B.V., PK Vianen (NL)

( * ) Notice: Subject to any disclaimer, the term of this patent is extended or adjusted under 35 U.S.C. 154(b) by 0 days.

(21) Appl. No.: 14/929,963

(22) Filed: Nov. 2, 2015

(65) Prior Publication Data

US 2016/0159177 A1    Jun. 9, 2016

(30) Foreign Application Priority Data

Nov. 3, 2014  (DE) .................. 10 2014 116 000

(51) Int. Cl.
| | |
|---|---|
| *B60D 1/52* | (2006.01) |
| *B60D 1/54* | (2006.01) |
| *B60D 1/48* | (2006.01) |
| *B60D 1/06* | (2006.01) |

(52) U.S. Cl.
CPC ............... *B60D 1/52* (2013.01); *B60D 1/06* (2013.01); *B60D 1/485* (2013.01); *B60D 1/54* (2013.01)

(58) Field of Classification Search
CPC . B60D 1/52; B60D 1/06; B60D 1/485; B60D 1/54
USPC .................................................. 280/491.3
See application file for complete search history.

(56) References Cited

U.S. PATENT DOCUMENTS

| | | | |
|---|---|---|---|
| 2,408,531 A | 10/1946 | Riemann et al. | |
| 5,853,186 A * | 12/1998 | Gentner ................ | B60D 1/246 280/491.1 |
| 6,092,827 A * | 7/2000 | Korpi .................... | B60D 1/54 280/491.1 |
| 7,338,064 B1 * | 3/2008 | Williams ............... | B60D 1/54 280/491.1 |
| 2010/0270774 A1 | 10/2010 | Boberg et al. | |
| 2013/0147157 A1 | 6/2013 | Lee et al. | |

FOREIGN PATENT DOCUMENTS

| | | |
|---|---|---|
| DE | 10 2012 105 935 A1 | 6/2013 |
| DE | 10 2012 004 999 A1 | 9/2013 |

* cited by examiner

*Primary Examiner* — Jacob D Knutson
*Assistant Examiner* — Felicia L. Brittman
(74) *Attorney, Agent, or Firm* — Reinhart Boerner Van Deuren P.C.

(57) ABSTRACT

In order to provide a trailer coupling device for motor vehicles, comprising a rear-side cross member which is mountable on a vehicle body, a supporting unit provided on the cross member which holds a ball neck receiving sleeve having a ball neck receptacle in which a ball neck incorporating a coupling ball is insertable and fixable therein, in which the ball neck receiving sleeve is minimally visible and disturbing when the ball neck is not inserted, it is proposed that the supporting unit comprises a pivot bearing unit by means of which the ball neck receiving sleeve is pivotable from a working position in which the ball neck is insertable therein in order to use a trailer, into a rest position in which an insertion opening of the ball neck receiving sleeve is arranged outside a visible region.

13 Claims, 17 Drawing Sheets

TRAILER COUPLING DEVICE FOR MOTOR VEHICLES

CROSS-REFERENCE TO RELATED PATENT APPLICATION

This patent application claims the benefit of German application No. 10 2014 116 000.2, filed Nov. 3, 2014, the teachings and disclosure of which are hereby incorporated in their entirety by reference thereto.

BACKGROUND OF THE INVENTION

The invention relates to a trailer coupling device for motor vehicles, comprising a rear-side cross member which is mountable on a vehicle body, a supporting unit provided on the cross member which holds a ball neck receiving sleeve having a ball neck receptacle in which a ball neck incorporating a coupling ball is insertable and fixed therein.

Trailer coupling devices of this type are usually trailer coupling devices as used in the United States and NAFTA countries, wherein the ball neck receiving sleeve in these trailer coupling devices is fixedly connected to the vehicle body.

This has the consequence that the ball neck receiving sleeve is always visible when looking at the rear region of the motor vehicle.

The object of the invention is therefore to achieve a trailer coupling device in which the ball neck receiving sleeve is minimally visible and disturbing when the ball neck is not inserted.

SUMMARY OF THE INVENTION

This object is achieved by a trailer coupling device of the type described at the beginning according to the invention, in that the supporting unit comprises a pivot bearing unit, by means of which the ball neck receiving sleeve is pivotable from a working position in which the ball neck is insertable therein in order to use a trailer, into a rest position in which an insertion opening of the ball neck receiving sleeve is arranged outside a visible region and is also therefore in particular no longer easily accessible for inserting a ball neck.

The advantage of this solution can be seen in that the ball neck receiving sleeve can thereby be moved into a non-disturbing position in a simple manner.

In order to improve in particular the ground clearance of the motor vehicle, it is preferably provided that the ball neck receiving sleeve in the rest position, when viewed in the direction of gravity, is arranged higher than in the working position.

Thus not only is the visual appearance of the motor vehicle improved, but an increase in the ground clearance of the motor vehicle is additionally possible.

It is particularly favourable if the ball neck receiving sleeve in the rest position, when viewed in the direction of forward travel of the motor vehicle, is arranged in front of the pivot axis, since an advantageous arrangement of the ball neck receiving sleeve in the rest position is thus possible.

Furthermore, one particularly favourable solution provides for the ball neck receiving sleeve in the rest position, when viewed in the direction of gravity, to be arranged above a plane which runs parallel to the road surface through the central axis of the ball neck receptacle in the working position.

This means that in the rest position the ball neck receiving sleeve is higher than the central axis of the ball neck receptacle in the working position.

One further favourable orientation of the ball neck receiving sleeve provides that a region of the ball neck receiving sleeve forming the insertion opening, in the rest position, is the lowest region thereof when viewed in the direction of gravity.

Preferably in this case the ball neck receiving sleeve is oriented such that, in the rest position, the insertion opening of the ball neck receiving sleeve is facing a road surface.

Furthermore, one further advantageous solution provides for the ball neck receiving sleeve in the rest position to project downwards in the direction of gravity with at most a quarter of its extension in the direction of gravity beyond the supporting unit, transversely to the central axis in the working position, such that the ground clearance required by the supporting unit is only adversely affected to a minor degree.

In relation to the vehicle body, it is preferably provided that the ball neck receiving sleeve in the rest position is arranged on a side of the pivot axis facing a vehicle body.

To achieve as compact an arrangement as possible of the ball neck receiving sleeve in the rest position, it is preferably provided that the ball neck receiving sleeve in the rest position is arranged in a receiving space of the supporting unit in an engaging manner, and thus with the supporting unit forming the receiving space, the size can be selected to be very compact.

It is preferably provided that the receiving space is arranged between side parts of the supporting unit.

Furthermore, the orientation of the ball neck receiving sleeve in the working position has not been further specified.

Thus, it is preferably provided that the ball neck receiving sleeve in the working position is arranged below the pivot axis when viewed in the direction of gravity, in order to be able to conveniently position the ball neck receiving sleeve for inserting the ball neck.

The ball neck receiving sleeve is preferably arranged in the working position such that, when viewed in the direction of gravity, it is arranged below a plane which is defined by a lower edge of the bumper unit and which is parallel to the road surface.

Furthermore, one advantageous solution provides that, in the working position, a central axis of the ball neck receptacle extends substantially horizontal when the motor vehicle is on a horizontally running road surface.

A substantially horizontal extent of the central axis should be understood as meaning that the deviation of the central axis from a precisely horizontal extent is at most 20°.

Furthermore, it is preferably provided that, in the rest position, a central axis of the ball neck receptacle runs substantially vertically when the motor vehicle is on a horizontal road surface, such that the ball neck receiving sleeve can thus be arranged in the rest position in a space-saving manner.

A substantially vertical extent of the central axis of the ball neck receptacle in the rest position should be understood as meaning that the central axis deviates from a precise vertical extent by at most 30°.

With regard to the arrangement of the pivot axis relative to the ball neck receiving sleeve, no further details have been given in connection with the present explanation of the individual embodiments.

Thus one advantageous solution provides that the pivot axis of the pivot bearing unit in the working position, when viewed in the direction of gravity, is located above a portion of the ball neck receiving sleeve adjoining the insertion opening.

Preferably this portion starting from the insertion opening thereby extends over at most half of the extent of the ball neck receiving sleeve in the direction of the central axis.

This will ensure that advantageous pivot kinematics are available in order to move the ball neck receiving sleeve in a space-saving manner from the easily accessible working position into the rest position, and to position it in the rest position in a space-saving manner.

With regard to the construction of the pivot bearing unit in detail, no further particulars have been given hitherto.

In principle, it would be conceivable to construct the pivot bearing unit such that the ball neck receiving sleeve is pivotable about a plurality of axes.

Furthermore, it is conceivable that the pivot bearing unit is constructed such that it is pivotable about a pivot axis which runs obliquely to a longitudinal central plane of the vehicle.

However, for simplicity of design, one advantageous solution provides that the pivot axis runs transversely to a longitudinal direction of the vehicle, in particular perpendicular to a longitudinal direction of the vehicle.

Furthermore, it is preferably provided that the pivot axis runs parallel to the cross member.

One further advantageous construction provides that the pivot bearing unit has only one single pivot axis.

For simplicity of the construction design, one particularly favourable solution provides that the single pivot axis is arranged fixedly in the supporting unit.

With regard to the specific construction of the pivot bearing unit, no further details have been given in connection with the present explanation of the individual embodiments.

Thus, one advantageous solution provides that the pivot bearing unit comprises support elements arranged on the ball neck receiving sleeve, which are pivotally mounted about the pivot axis on side parts of the supporting unit by means of a pivot bearing.

Fundamentally, only a pivoting of the ball neck receiving sleeve about the pivot axis is given by the pivot bearing unit; however it is not specified in more detail how the working position and the rest position should be determined.

For this reason, a pivot guide is preferably provided, which determines the working position and the rest position.

The pivot guide can thereby be implemented in the simplest case by means of stop elements for the working position and the rest position.

One advantageous embodiment provides that the pivot guide is constructed as a track guide and thus additionally serves to precisely guide the ball neck receiving sleeve during the pivot movement.

It is thereby preferably provided that the side parts of the supporting unit are provided with guide tracks in which a track runner connected to the ball neck receiving sleeve is guided.

Thus, in addition to the pivot bearing unit, guiding as well as stabilisation of the ball neck receiving sleeve relative to the supporting unit, at least in the working position, can also be realised, since the largest forces act on the ball neck receiving sleeve in the working position.

In order to be able to fix the ball neck receiving sleeve about the pivot axis in the working position, because of its pivotability, a first locking unit is preferably provided, which locates the ball neck receiving sleeve in the working position relative to the supporting unit.

In order to furthermore achieve a fixing of the ball neck receiving sleeve in the rest position, a second locking unit is preferably provided, which locates the ball neck receiving sleeve in the rest position relative to the supporting unit.

Thus, the first and/or second locking unit can be constructed in different ways.

One advantageous solution provides that a locking unit of this type comprises two locking elements, one of which is connected to the supporting unit and one of which is connected to the ball neck receiving sleeve.

For example, the locking elements can be constructed in different ways.

One advantageous solution provides that one of the locking elements has at least one pivot latch which, in the locking position, abuts a latch part which forms the other of the locking elements.

It is provided in a constructionally particularly favourable case that one of the locking elements is arranged on the track runner or is formed thereby.

When two locking units are provided, in order to avoid the two locking units having to be separately actuated, one advantageous solution provides that the locking units are coupled by means of a coupling device, such that, by actuating one of the locking units to release it, the other locking unit is also actuable to be released.

Another advantageous solution provides that the first locking unit is constructed in such a way that it cannot be released when the ball neck is inserted into the ball neck receptacle in the working position, and holds the ball neck receiving sleeve fixedly in the working position, and that the locking unit can be released when the ball neck is removed from the ball neck receptacle, in particular by removing the ball neck.

In order to improve safety when locking the ball neck receiving sleeve, at least in the working position, a safety device is preferably provided which secures at least the first locking unit in the locked position, such that release of the first locking unit which secures the ball neck receiving sleeve in the working position is only possible once the safety device has been released.

Thus, double the safety is given, which results in significant advantages for the operational safety of the trailer coupling device in the working position of the ball neck receiving sleeve.

Moreover, no further details have been given in any of the preceding embodiments with regard to the execution of the pivot movement of the ball neck receiving sleeve between the working position and the rest position and vice versa.

Thus it is possible, for example, to execute the pivot movement from the working position to the rest position by manual action.

Moreover, it is possible, for example, to construct the pivot bearing unit such that the ball receiving sleeve moves from the rest position to the working position after release of the second locking unit, due to the effect of gravity.

However, it is also possible to provide a resilient element which supports or triggers a pivoting of the ball neck receiving sleeve from the rest position to the working position, wherein in this case the pivoting of the ball neck receiving sleeve from the working position to the rest position must then occur against the force of this resilient element.

However, it is also possible in the context of the solution according to the invention, to provide a pulling element or a lever which enables the ball neck receiving sleeve to be operated in order to pivot it, for example, from the working position to the rest position.

Alternatively, however, it is also possible to execute the pivot movement in a motor-driven manner such that the pivoting from the working position to the rest position and from the rest position to the working position occurs by means of a motor, preferably an electric motor, and therefore a manual action is not necessary.

Moreover, no further details have been likewise given with regard to the actuation of the locking unit or the two locking units.

Thus, it would be conceivable, for example, to actuate the locking unit and also the safety device manually.

However, it is also conceivable to provide a drive unit by means of which the first locking unit or the second locking unit or both locking units and the safety device can be actuated.

Preferably, a drive unit of this type comprises likewise an electrically operable drive, either a solenoid or an electric motor which applies the actuating force to actuate one or both locking units and/or also the safety device.

Further features and advantages of the invention are the subject of the following description as well as the graphical representation of several embodiments.

DETAILED DESCRIPTION OF THE INVENTION

Figure 1:
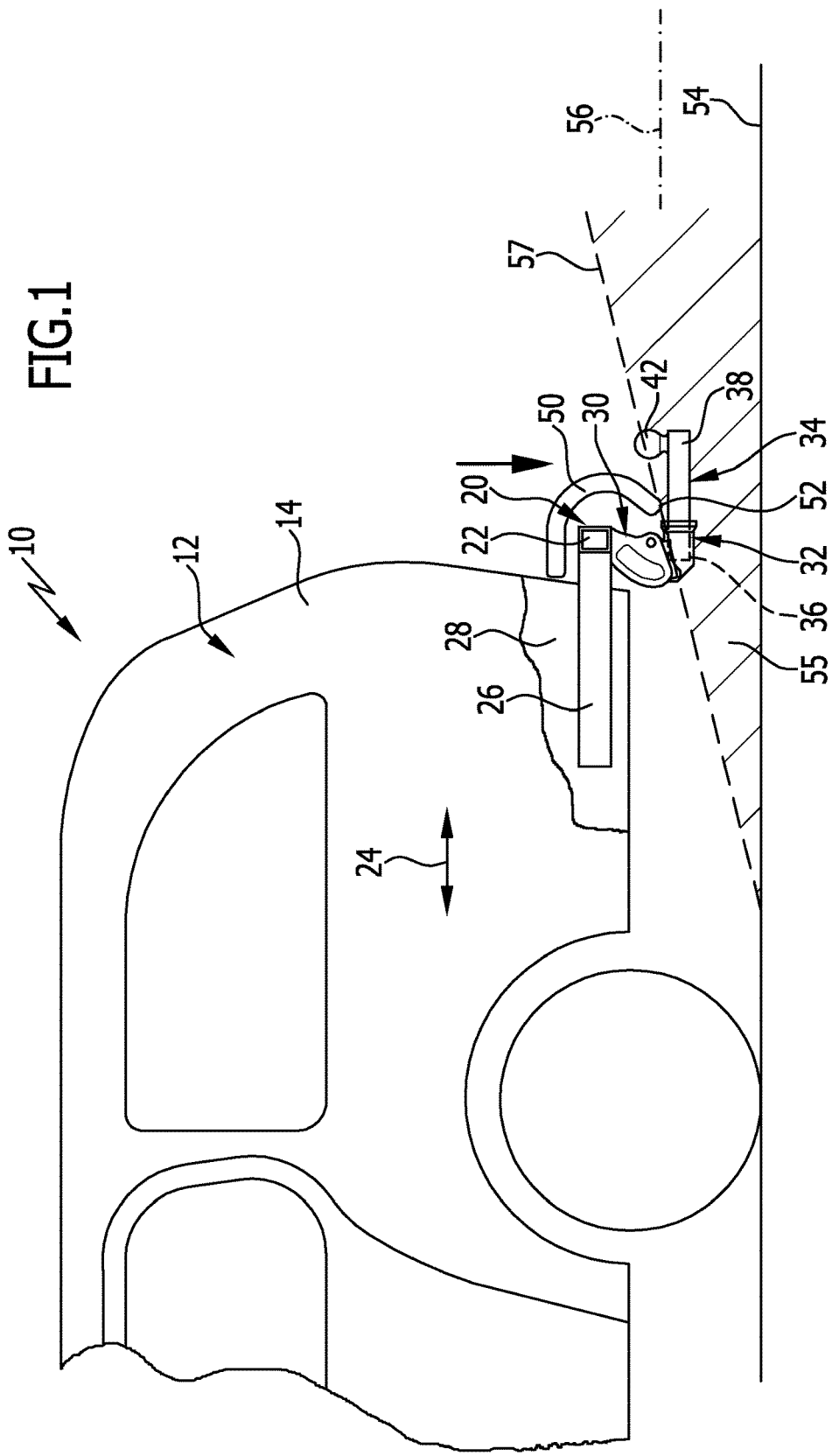
FIG. 1 is a schematic side view of a motor vehicle with a first embodiment of a trailer coupling device according to the invention.

A motor vehicle indicated as a whole by 10 in FIG. 1 comprises a vehicle body 12 on which a trailer coupling device 20 according to the invention is mounted in a rear region 14.

The trailer coupling device 20 comprises a cross member 22 which extends transversely to a longitudinal direction 24 of the vehicle and, for example, by means of side supports 26 extending parallel to the longitudinal direction 24 of the vehicle, is connected via vehicle body portions 28 also extending in the longitudinal direction 24 of the vehicle to the rear region 14 of the vehicle body 12.

A supporting unit indicated as a whole by 30 is provided on the cross member 22, which supporting unit holds a ball neck receiving sleeve indicated as a whole by 32.

A ball neck indicated as a whole by 34 is insertable into this ball neck receiving sleeve 32, which ball neck has an insertion portion 36 which forms an end of the ball neck 34, while another opposite end 38 of the ball neck 34 which projects beyond the ball neck receiving sleeve 32 holds a coupling ball 42.

Figure 2:
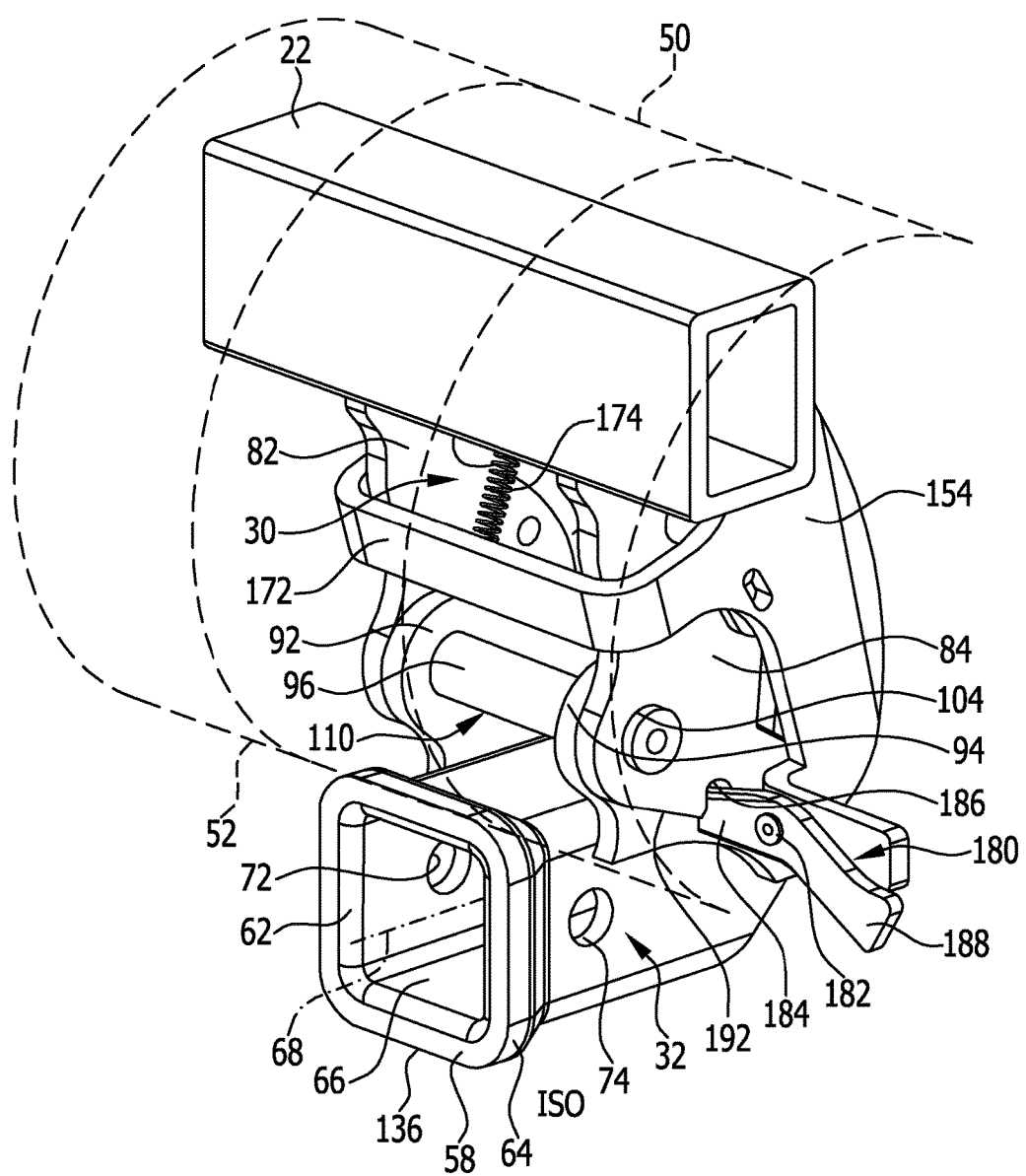
FIG. 2 is a perspective view of the first embodiment of the trailer coupling device according to the invention with a bumper unit indicated only schematically from the rear right.

In the case of the motor vehicle 10 according to the invention, the cross member 22, the end portions of the side supports 26 for example supporting the cross member 22, and the supporting unit 30 are preferably covered by a bumper unit 50 of the vehicle body, which bumper unit overlaps the cross member 22 on an upper side facing away from a road surface 54 and a rear side facing away from the rear region 14 of the vehicle body 12, and also overlaps the supporting unit 30 on the side thereof which faces away from the rear region 14, such that when the vehicle body 12 is viewed from behind, only the ball neck receiving sleeve 32 in the working position thereof is in a visible region 55 below a lower edge 52 of the bumper unit 50, such that in the working position, as shown in particular in FIG. 2, an insertion opening 62 of the ball neck receiving sleeve 32 is visible, which insertion opening is preferably surrounded by a reinforcing collar 64 of the ball neck receiving sleeve 32.

The visible region 55 is limited by a line of sight 57 which is inclined at 15° with respect to the road surface 54 and which touches the lower edge 52 of the bumper unit 50, and is below said line of sight.

Starting from the insertion opening 62, a ball neck receptacle 66 extends into the ball neck receiving sleeve 32, wherein the ball neck receptacle 66 preferably has a rectangular cross section.

Preferably, in the working position of the ball neck receptacle 66 shown in FIG. 2, a central axis 68 of the ball neck receptacle 66 runs approximately parallel to the direction of travel 24 and also approximately horizontal when the motor vehicle 10 is on a horizontal road surface 54.

Here, approximately parallel and approximately horizontal should be understood as meaning a deviation of up to 20° from a precisely parallel or a precisely horizontal line.

In connection with the reinforcing collar 64, the ball neck receiving sleeve 32 is provided on opposite sides with openings 72 and 74, through which a fixing bolt (not shown in the drawings) is insertable in order to fix the insertion portion 36 of the ball neck 34 in the ball neck receptacle 66, such that said insertion portion is fixed immovably in the ball neck receptacle in the direction parallel to the central axis 68.

Moreover, the insertion portion 36 is also fixed in the ball neck receptacle 66 against a rotational movement about the central axis in that the ball neck receptacle 66 has an approximately rectangular cross section, and it is also fixed against movements transverse to the central axis 68 in that the insertion portion 36 of the ball neck 34 is guided in the ball neck receptacle 66 with only minimal play.

Figure 3:
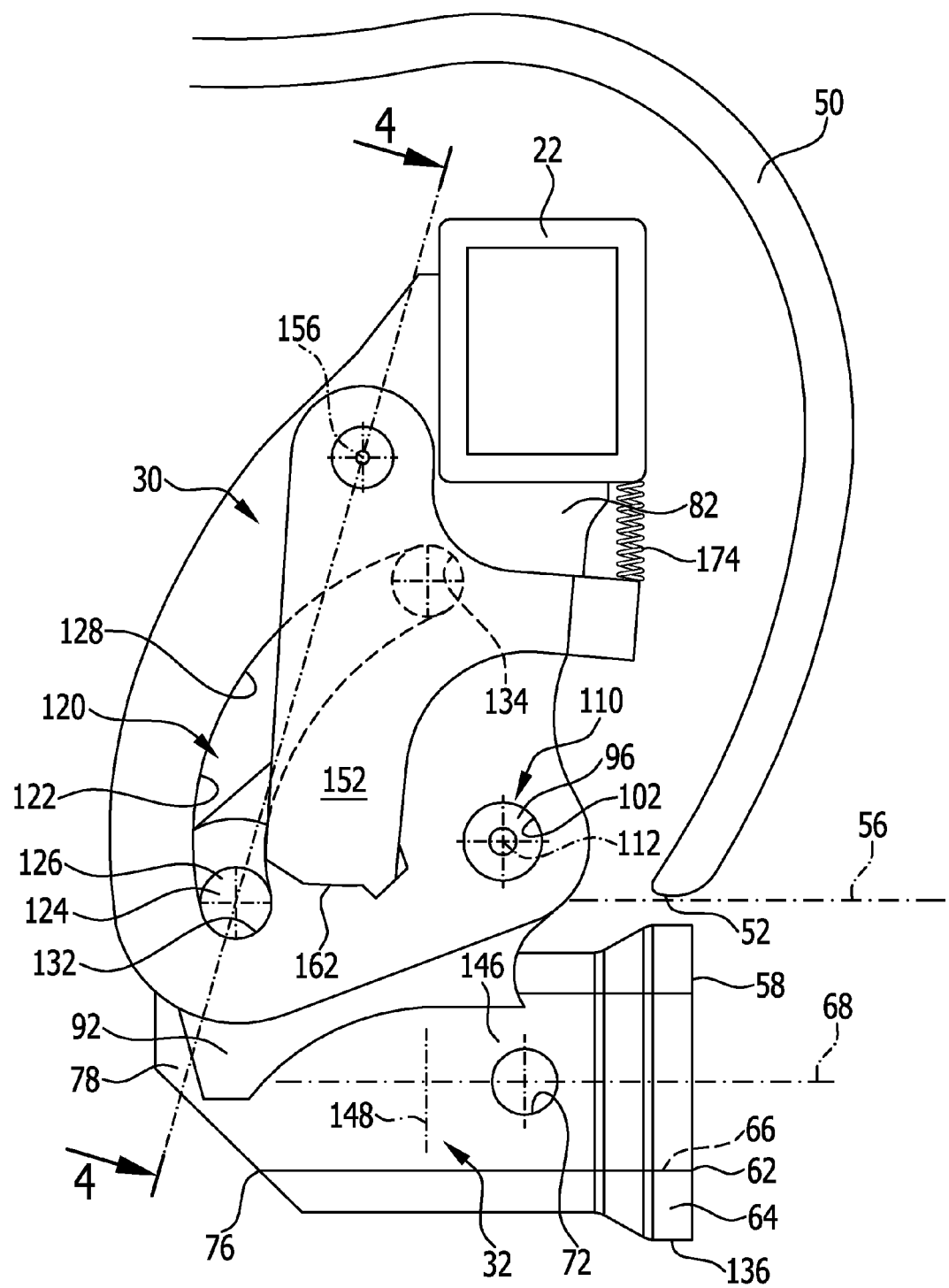
FIG. 3 is an enlarged side view of the first embodiment of the trailer coupling device according to the invention according to the perspective in FIG. 1.

Preferably, the ball neck receiving sleeve 32, as shown in FIG. 3, is constructed such that the ball neck receptacle 66, starting from the insertion opening 62, extends therethrough, indeed as far as a rear-side opening 76 of the ball neck receiving sleeve 32.

As can be seen from FIG. 1 to FIG. 3, the ball neck receiving sleeve 32 is located above the road surface 54 and at a distance from the road surface 54 such that it is located close to, but below, a plane 56 running through the lower edge 52 of the bumper unit 50 and extending parallel to the road surface 54.

Thus the ball neck 34 can be simply inserted into the easily accessible insertion opening 62 of the ball neck receptacle 66, and the ball neck receiving sleeve 32 is also accessible in such a way that the fixing bolt is insertable through the openings 72, 74 with easy accessibility.

Figure 4:
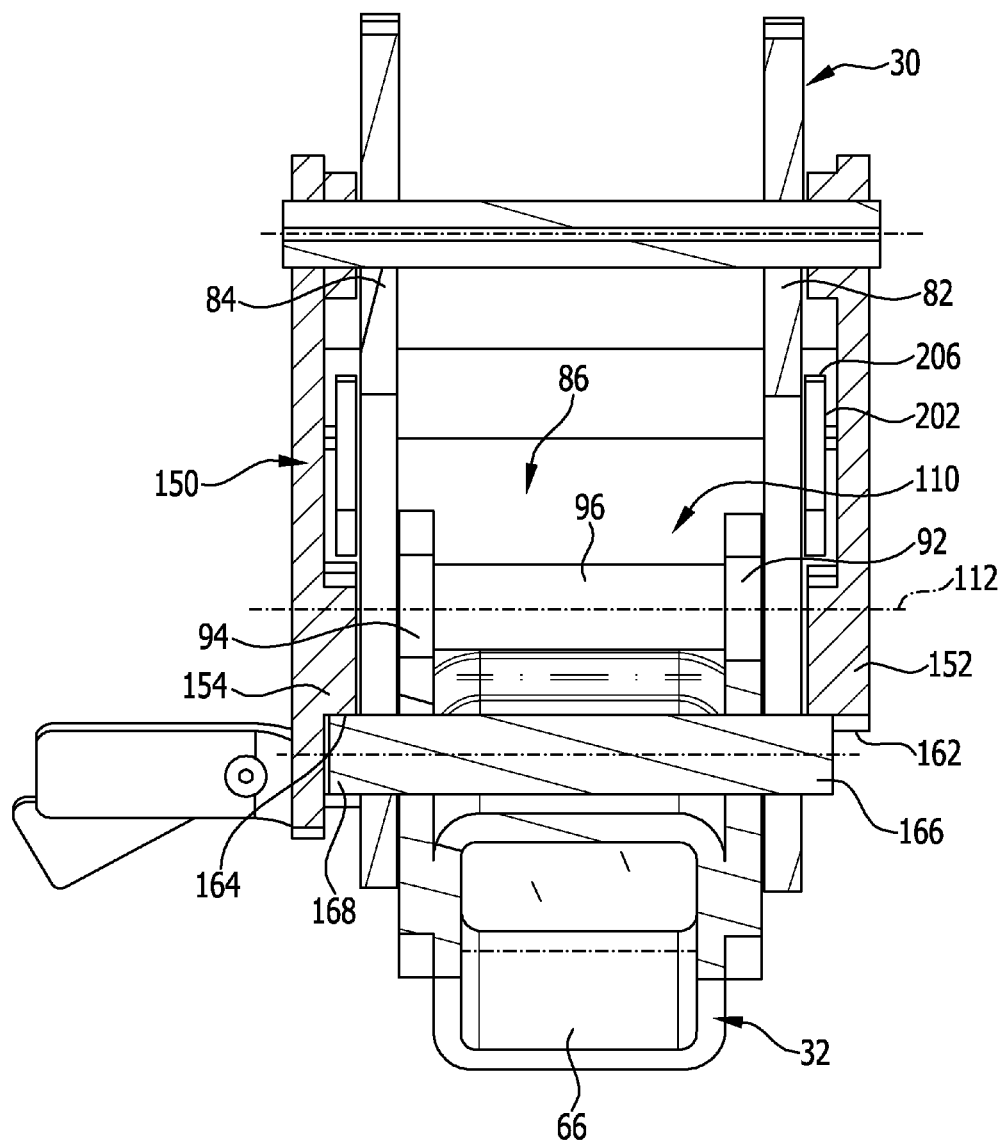
FIG. 4 is a section along line 4-4 in FIG. 3.

As shown in FIG. 2 to FIG. 4, the supporting unit 30 comprises two side parts 82 and 84 connected to the cross member 22 which start from the cross member 22 in the direction of the ball neck receiving sleeve 32 and are arranged such that a receiving space 86 is located between them.

When the ball neck receiving sleeve 32 is in the working position, support elements 92 and 94 held on the ball neck receiving sleeve 32 engage in this receiving space 86, which support elements is pivotable relative to a pivot pin 96, wherein the pivot pin 96 penetrates openings 102 and 104 in the side parts 82 and 84 of the supporting unit 30.

Here, the pivot pin 96 is either for its part rotatably mounted in the openings 102 and 104 or penetrates the openings 102 and 104, is connected thereto in a rotatably fixed manner and the support elements 92 and 94 are rotatably mounted relative to the pivot pin 96.

However, for simplicity, it is also conceivable that the pivot pin 96 is arranged rotatably relative both to the support elements 92 and 94 and to the openings 102 and 104.

The support elements 92 and 94 together with the pivot pin 96 and the openings 102 and 104 collectively form a pivot bearing unit 110 for mounting the ball neck receiving sleeve 32 in order to be able to pivot the latter about a pivot axis 112 defined by a central axis of the pivot pin 96.

For example, the pivot axis 112 is the only pivot axis about which the ball neck receiving sleeve 32 is pivotable relative to the supporting unit 30.

Furthermore, the pivot axis 112 in particular runs parallel or substantially parallel to the cross member 22, whereby substantially parallel also allows a deviation of up to 20° from a precisely parallel orientation.

As shown in FIG. 3, the ball neck receiving sleeve 32 is located at least with the region thereof comprising the openings 72 and 74 below the side parts 82, 84 of the supporting unit 30 and below the plane 56, the distance of which to the road surface 54 is defined by the distance of the lower edge 52 of the bumper unit 50 from the road surface 54.

In order to determine the working position and the rest position and to achieve a sufficiently stable guidance of the ball neck receiving sleeve 32 during pivot movement about the pivot axis 112, a pivot guide indicated as a whole by 120 is provided, which comprises a guide track 122 provided in the side parts 82 and 84, as well as a track runner 124 guided in the guide track 122, wherein the track runner 124 is also held on the support elements 92 and 94 but arranged at a distance from the pivot axis 112.

Preferably the track runner 124 is a bolt 126 extending parallel to the pivot axis 112, said bolt engaging through guide slots 128 in the side parts 82 and 84, which guide slots are constructed as a guide track 122 and run around the pivot axis 112 at a defined radius, and being guided along the guide slots 128.

Figure 6:
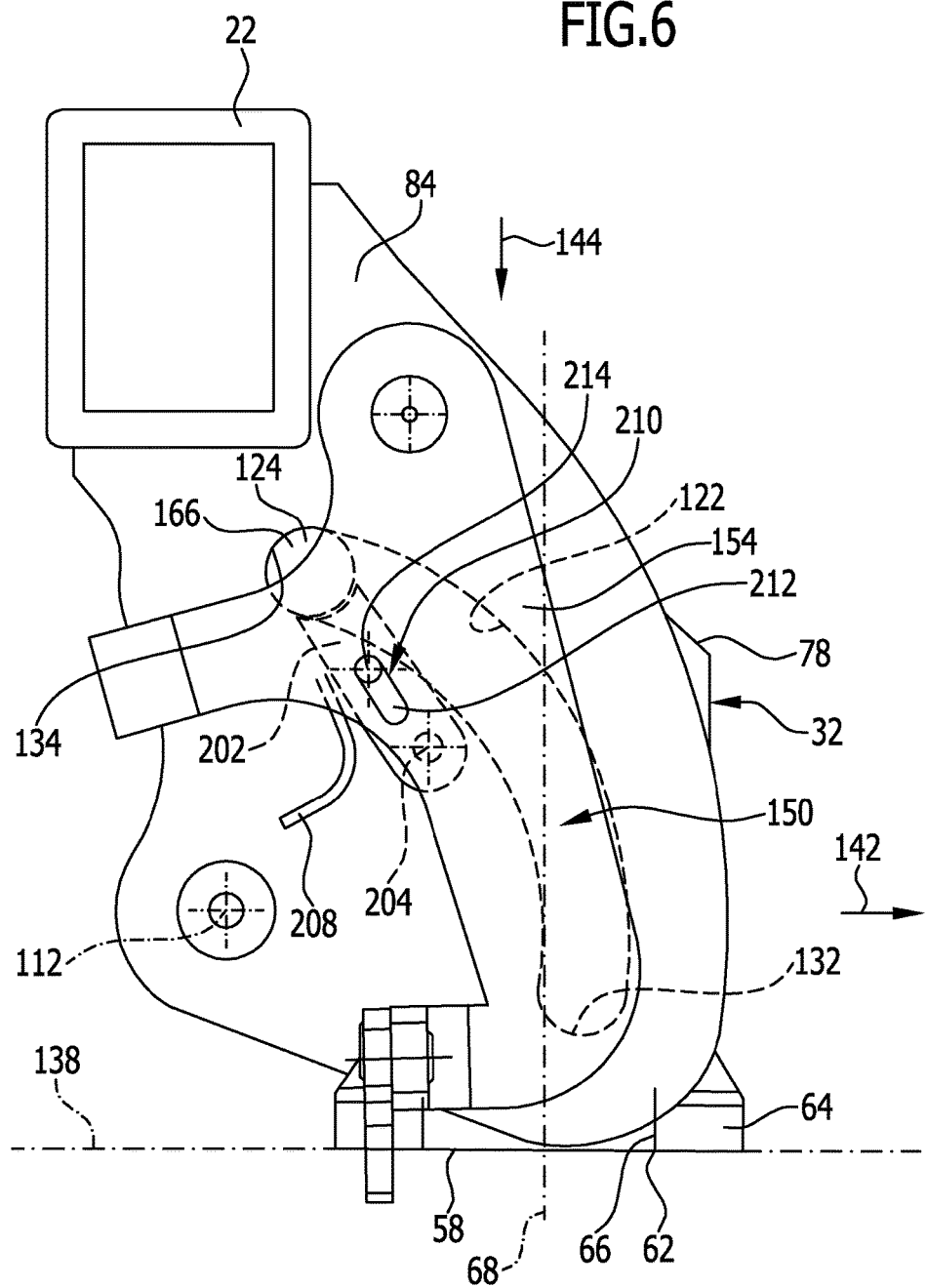
FIG. 6 is a side view of the first embodiment similar to FIG. 5 with the ball neck receiving sleeve in the rest position.
Figure 7:
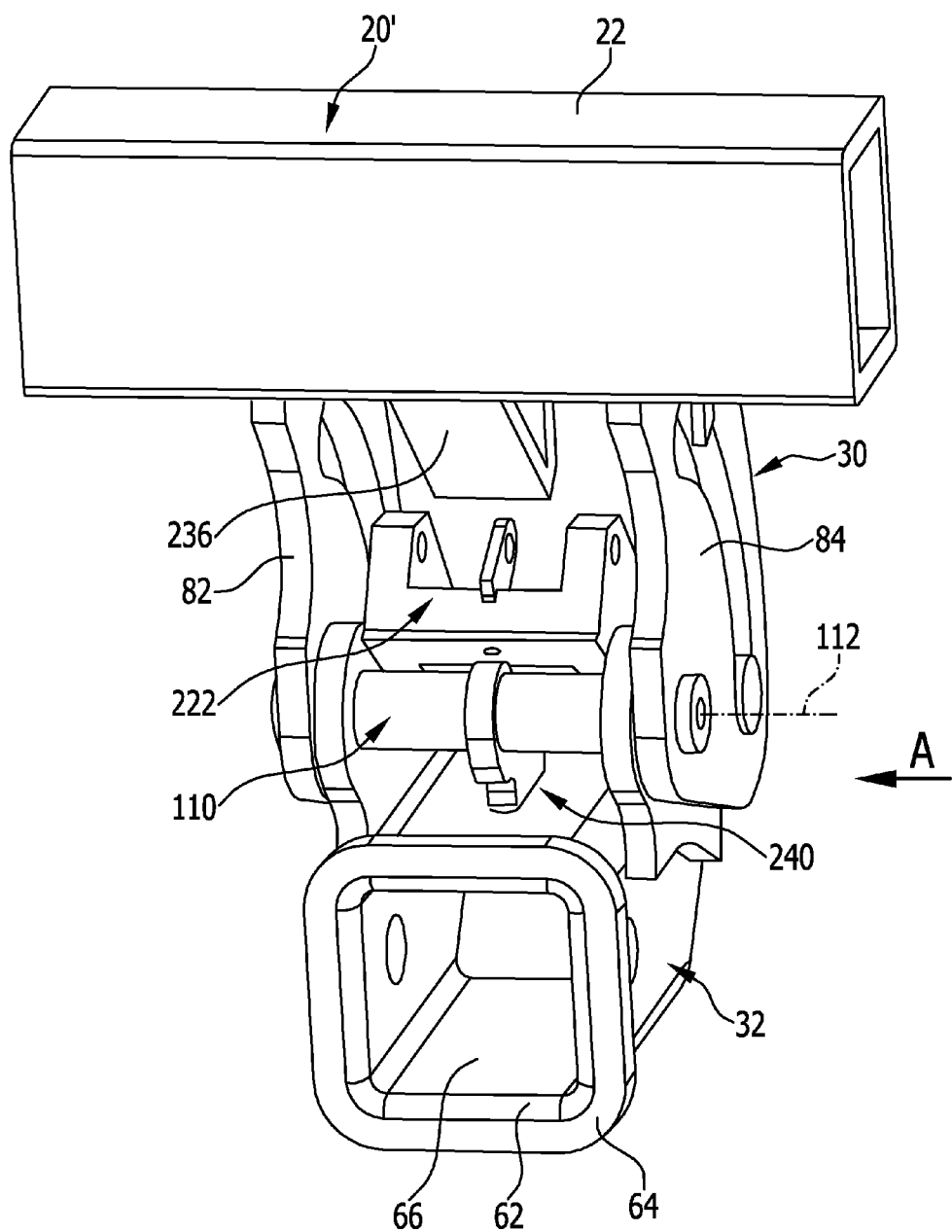
FIG. 7 is a perspective view from behind of a second embodiment of a trailer coupling device according to the invention.
Figure 8:
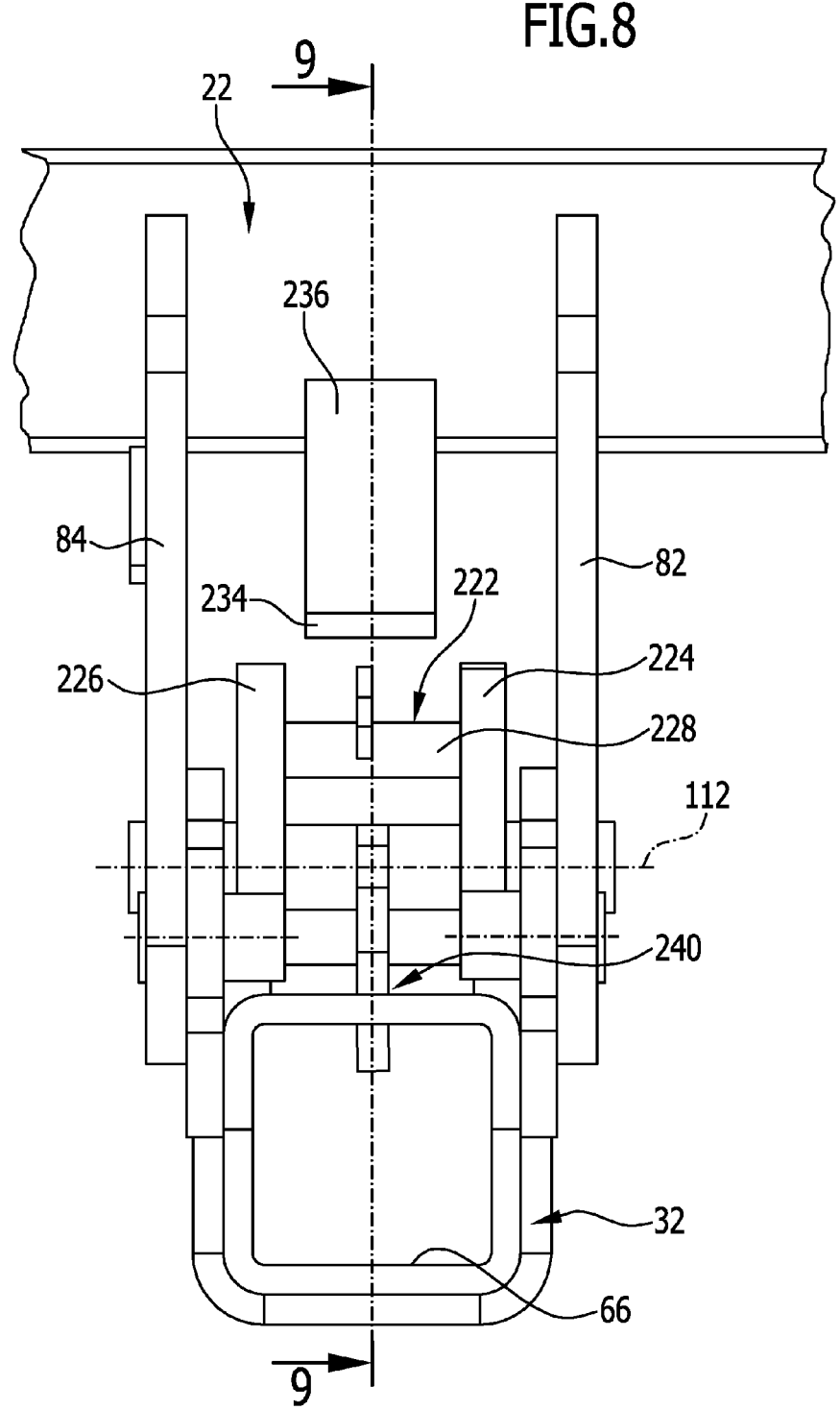
FIG. 8 is a top view of the second embodiment of the trailer coupling device according to the invention opposite to the direction of travel.

The guide track 122 defines the orientation of the central axis 68 of the ball neck receptacle 66 in the working position by a first end region 132 against which the track runner 124 abuts in the working position, and also the orientation of the central axis 68 of the ball neck receptacle 66 in the rest position by a second end region 134 against which the track runner 124 abuts in a rest position of the ball neck receiving sleeve 32, as shown in FIG. 6.

As can be seen in FIG. 6, the ball neck receiving sleeve 32 is raised by a pivoting motion of the end region 78 opposite the reinforcing collar 64 about the pivot axis 112 and pivoted towards the cross member 22, wherein the reinforcing collar 64 with the insertion opening 62 simultaneously initially moves downwards away from the lower edge 52 of the bumper unit 50 and thus also from the plane 56, but is then raised by further pivoting, such that finally, in the rest position shown in FIG. 6, the reinforcing collar 64 with the insertion opening 62 is raised so far that the end face 58 of the ball neck receiving sleeve 32 having the insertion opening 62 is facing the road surface 54 and moreover is arranged at a greater distance from the road surface 54 than a lowest region 136 of the ball neck receiving sleeve 32 facing the road surface 54 in the working position, wherein this lowest region 136 is preferably formed by the reinforcing collar 64 if such a collar is present.

Preferably, in the rest position, the end face 58 is located in a plane 138 extending parallel to the road surface 54, which plane extends at a greater spacing from the road surface 54 than the central axis 68 of the ball neck receptacle 66 in the working position of the ball neck receiving sleeve 32.

In particular, the ball neck receiving sleeve 32 in the rest position is located, as shown in FIG. 6, in front of the pivot axis 112 when viewed in a forward direction of travel 142 of the motor vehicle 10, and thus on a side of the pivot axis 112 facing the rear region 14 of the vehicle body 12.

In particular, it is thereby provided that the central axis 68 of the ball neck receptacle 66 in the rest position extends substantially parallel to the direction of gravity 144, whereby a substantially parallel extent of the central axis 68 in the rest position should be understood as meaning a deviation from a precisely parallel extent to the direction of gravity 144 of up to 30°.

The specification of this substantially parallel extent of the central axis 68 with respect to the direction of gravity 144 applies to the case where the motor vehicle 10 having the trailer coupling device according to the invention is on a horizontal road surface 54.

The orientation of the ball neck receiving sleeve 32 with its central axis 68 is determined in a defined manner by means of the pivot guide 120 on the one hand, both in the working position and in the rest position, and moreover an additional stabilisation of the ball neck receiving sleeve 32 in the working position and the rest position.

These positions of the ball neck receiving sleeve 32 both in the working position and the rest position can in particular be achieved in that the pivot axis 112 in the working position of the ball neck receiving sleeve 32 is located on a side of the ball neck receiving sleeve 32 facing away from the road surface 54 and moreover, when viewed in the direction of gravity 144, is located above a portion 146 of the ball neck receiving sleeve 32 starting from the end face 58, which portion has the openings 72 and 74 for the fixing bolt and extends parallel to the central axis 68 at most up to the longitudinal centre 148 of the ball neck receiving sleeve 32.

Figure 5:
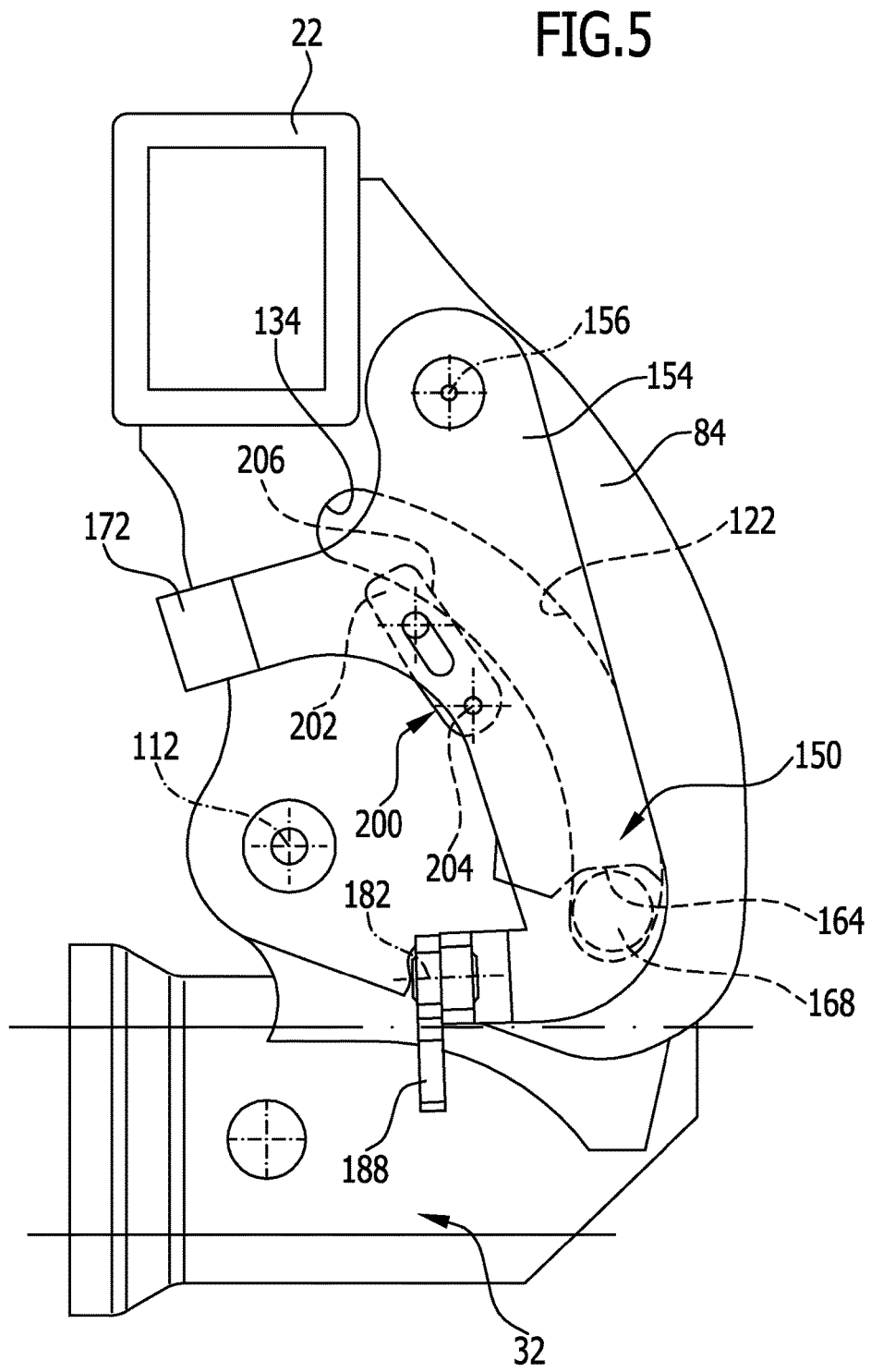
FIG. 5 is a side view similar to FIG. 3 but from the opposite side of the first embodiment of the trailer coupling according to the invention in the working position of the ball neck receiving sleeve.

In order to fix the pivoting position corresponding to the working position of the ball neck receiving sleeve 32, as shown in FIGS. 3, 4 and 5, a first locking unit 150 is provided which has pivot latches 152 and 154 mounted respectively on the side parts 82 and 84, which pivot latches is pivotable about a pivot latch axis 156, wherein the pivot latch axis 156 is arranged for example on a side of the guide track 122 facing away from the ball neck receiving sleeve 32 in the working position.

Furthermore, the pivot latches 152 and 154 have latch surfaces 162 and 164 which can be applied to latch members 166, 168 projecting over the side parts 82 and 84 and, for example, formed by the track runner 124, in order to fix the track runner 124 in the pivoting position of the ball neck receiving sleeve 32 corresponding to the working position, in which pivoting position the track runner 124 abuts the respective end region 132 of the guide track 122, and to prevent the track runner 124 from moving in the direction of the second end region 134.

In the simplest case, the latch members 166 and 168 are ends of the bolt 126 forming the track runner 124.

In order to achieve this locking of the working position with the latch surfaces 162 and 164, the pivot latches 152, 154 is pivotable from the release position shown in FIG. 3 so far that the latch surfaces 162 and 164 are arranged overlapping with the guide track 122, abut the latch members 166 and 168 when the ball neck receiving sleeve 32 is in the working position and block movement thereof along the guide track 122.

Furthermore, the pivot latches 152 and 154 are connected preferably for joint actuation thereof by a bracket 172 such that the pivot latches 152 and 154 is pivotable synchronously with one another about the pivot latch axis 156.

Preferably, the pivot latches 152 and 154 are acted upon by a resilient element 174 such that they always tend to move into their locking position, in which the latch surfaces 162 and 164 hold the latch members 166 and 168 in their position corresponding to the working position.

Furthermore, a safety device 180 is associated with one of the pivot latches, for example the pivot latch 154, said safety device also being constructed as a safety latch 184 pivotable about an axis 182, which safety latch engages, in the locking position of the pivot latch 154, in a recess 186 of the side parts, for example in the side part 84, in order to prevent the synchronously movable pivot latches 152 and 154 leaving the locking position in the direction of their unlocking position, despite the effect of the resilient element 174.

Only when the safety element 184 is moved out of the recess 186, for example by operating a control element 188, is a release of the safety device 180 possible when the pivot latches 152 and 154 are in the locking position, wherein, after leaving the locking position, the safety element 184 slides along a guide edge 192 of the side part 84 incorporating the recess 186. Only when the pivot latches 152 and 154 have reached their locking position again by the effect of the resilient element 174 can the safety element 184 engage again in the recess 186.

As shown in FIG. 5 and FIG. 6, a second locking unit 200 is additionally provided which also has a pivot latch 202 which is pivotable about a pivot latch axis 204, wherein the pivot latch axis 204 is arranged on a side of the guide track 122 facing the pivot axis 112 and at a distance from the end region 134.

The pivot latch 202 has, for its part, a latch surface 206 which can be moved into a locking position overlapping with the guide track 22, and, as shown in FIG. 6, for example locks the latch member 166 in the position thereof corresponding to the rest position, in which it abuts the end region 134.

The pivot latch 202 is also preferably acted upon by a resilient element 208 in the direction of its locking position, such that the pivot latch 202 always tends to pass into its locking position, in particular when the latch member 166 has been moved past the pivot latch 202 in the direction of the rest position and has reached the position corresponding to the rest position of the ball neck receiving sleeve 32, in which position the track runner 124 abuts the end region 134.

Preferably, the first locking unit 150 and the second locking unit 200 are coupled to one another by means of a coupling device 210, wherein the coupling device 210 has for example a coupling element 212, for example in the form of an elongate hole, associated with one of the pivot latches 152, 154, in particular with the pivot latch 154 in the case shown in FIG. 6, and a coupling element 214, in particular in the form of a pin, associated with the pivot latch 202, which coupling elements engage in one another and indeed in such a way that, when the first locking unit 150 is actuated and thus the pivot latches 152 and 154 are moved from the locking position into the unlocking position, the pivot latch 202 is simultaneously actuated and thus either the locking in the working position or the locking in the rest position can be released by moving the pivot latches 152, 154 and the pivot latch 202 out of the locking positions.

In a second embodiment of a trailer coupling device 20' according to the invention, shown in FIGS. 7 to 13, the cross member 22 and the supporting unit 30 having the side parts 82 and 84, as well as the ball neck receiving sleeve 32 and the pivot bearing unit 110 provided for the pivotable mounting thereof on the supporting unit 30, and furthermore also the pivot guide 120, are constructed in the same way as in the first embodiment, such that full reference can be made in this regard to the information about the first embodiment.

However, the first locking unit 150' for locking the ball neck receiving sleeve 132 in the working position is constructed differently.

In order to fix the ball neck receiving sleeve 32 in the working position, the first locking unit 150' comprises a pivot latch 222 which is pivotally mounted on the track runner 124 or is pivotable with the track runner 124 relative to the support elements 92, 94.

Figure 10:
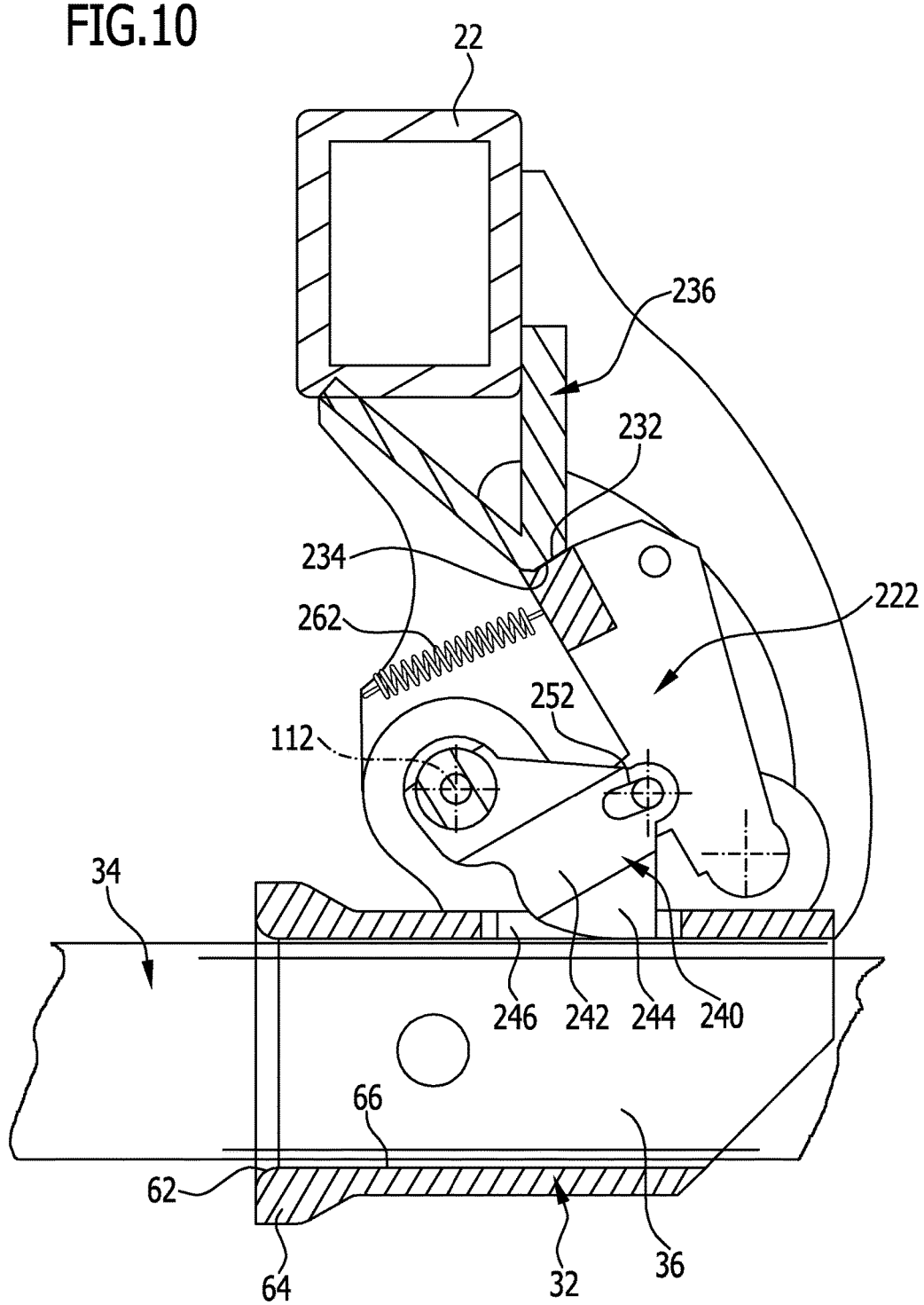
FIG. 10 is a section similar to FIG. 9 through the second embodiment of the trailer coupling device according to the invention in a locking position of the first locking unit.
Figure 11:
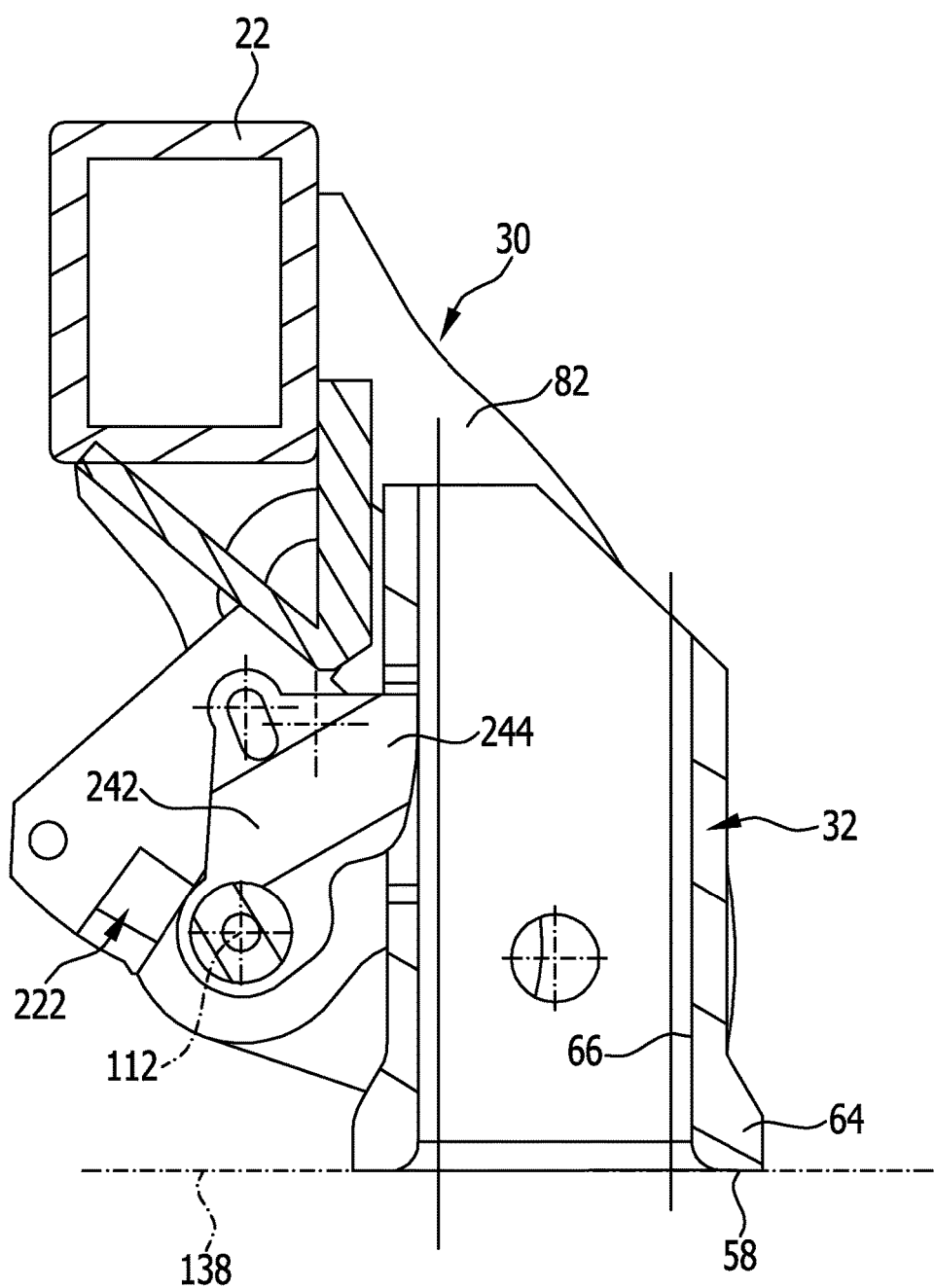
FIG. 11 is a section similar to FIG. 9 through the second embodiment of the trailer coupling device according to the invention with the ball neck receiving sleeve in the rest position.

The pivot latch 222 here is formed by two arms 224 and 226 starting from the track runner 124, which arms are connected to one another by a bar 228. The pivot latch 222 comprises furthermore a latch surface 232 which can be disposed on a contact surface 234 of a support member 236 held on the supporting unit 30 or the cross member 22, if, as shown in FIG. 10, the ball neck receiving sleeve 32 is to be locked in its working position.

Figure 9:
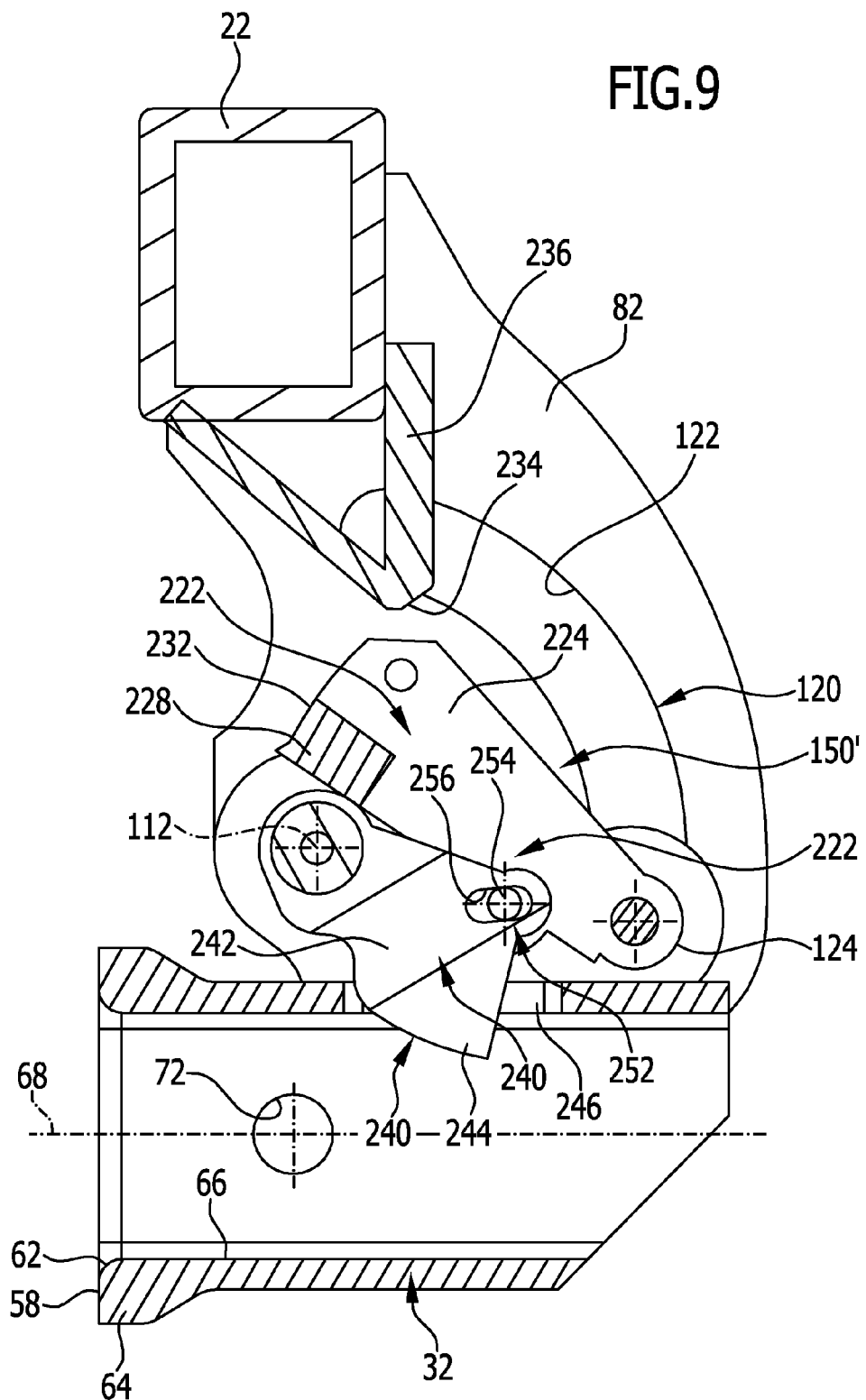
FIG. 9 is a section along line 9-9 in FIG. 8 in an unlocking position of the first locking unit.

On the other hand, if the ball neck receiving sleeve 32 is to be pivoted from the working position into the rest position, then the pivot latch 222 is pivotable into the unlocking position shown in FIG. 9, in which position the pivot latch 222 is pivoted from the locking position in the direction of the pivot axis 112 and for example abuts a stop in the unlocking position.

In this unlocking position, the ball neck receiving sleeve 32 is pivotable from the working position into the rest position.

No resilient element is provided to move the pivot latch 222 from the unlocking position to the locking position, but a pivot latch operating mechanism 240 which has an actuating member 242 which on the one hand is pivotally mounted about an axis, for example about a pivot axis 112, preferably on the pivot pin 96, and has a detecting projection 244 which engages in the ball neck receptacle 66 through an opening 246 provided in the ball neck receiving sleeve 32, when no ball neck 34 is inserted in the ball neck receptacle 66 with its insertion portion 36.

The actuating member 242 is coupled here with the pivot latch 222 by means of a coupling unit 252, wherein the coupling unit 252 has, for example, a bolt 254 arranged on the pivot latch 222 as a first coupling element and an elongate hole 256 arranged on the actuating member 242 as a second coupling element.

The coupling unit 252 now couples the movement of the actuating member 242 with the movement of the pivot latch 232 in such a way that when inserting the ball neck 34 with its insertion portion 36 into the ball neck receptacle 66, and thus when the detecting projection 244 is acted upon, the actuating member 242 is pivoted about the pivot axis 212 and thereby acts upon the pivot latch 222 via the coupling unit 252 in such a way that the pivot latch moves from the unlocking position shown in FIG. 9 to the locking position shown in FIG. 10, in which locking position the latch surface 232 abuts the contact surface 234 of the support member 236 which is held for example on the cross member 22, such that the ball neck receiving sleeve 232 is thereby locked in the working position.

In this embodiment a resilient element 262 is preferably provided which acts upon the pivot latch 222 in such a way that the latter always tends to pass into its unlocking position and thus the actuating member 242 with the detecting projection 244 tends to move through the opening 246 into the ball neck receptacle 66. As a result, only when the detecting projection 244 is acted upon by inserting a ball neck 34 with its insertion portion 36 into the ball neck receptacle 66, the actuating member 242 is pivoted in such a way that it moves the pivot latch 222 against the force of the resilient element 262 from the unlocking position according to FIG. 9 into the locking position according to FIG. 10.

On the other hand, pulling out the insertion portion 36 of the ball neck 34 leads to the actuating member 242 with the detecting projection 244 moving back into the ball neck receptacle 66 because of the effect of the resilient element, and thus the pivot latch 262 also being able to move back into the unlocking position.

Figure 12:
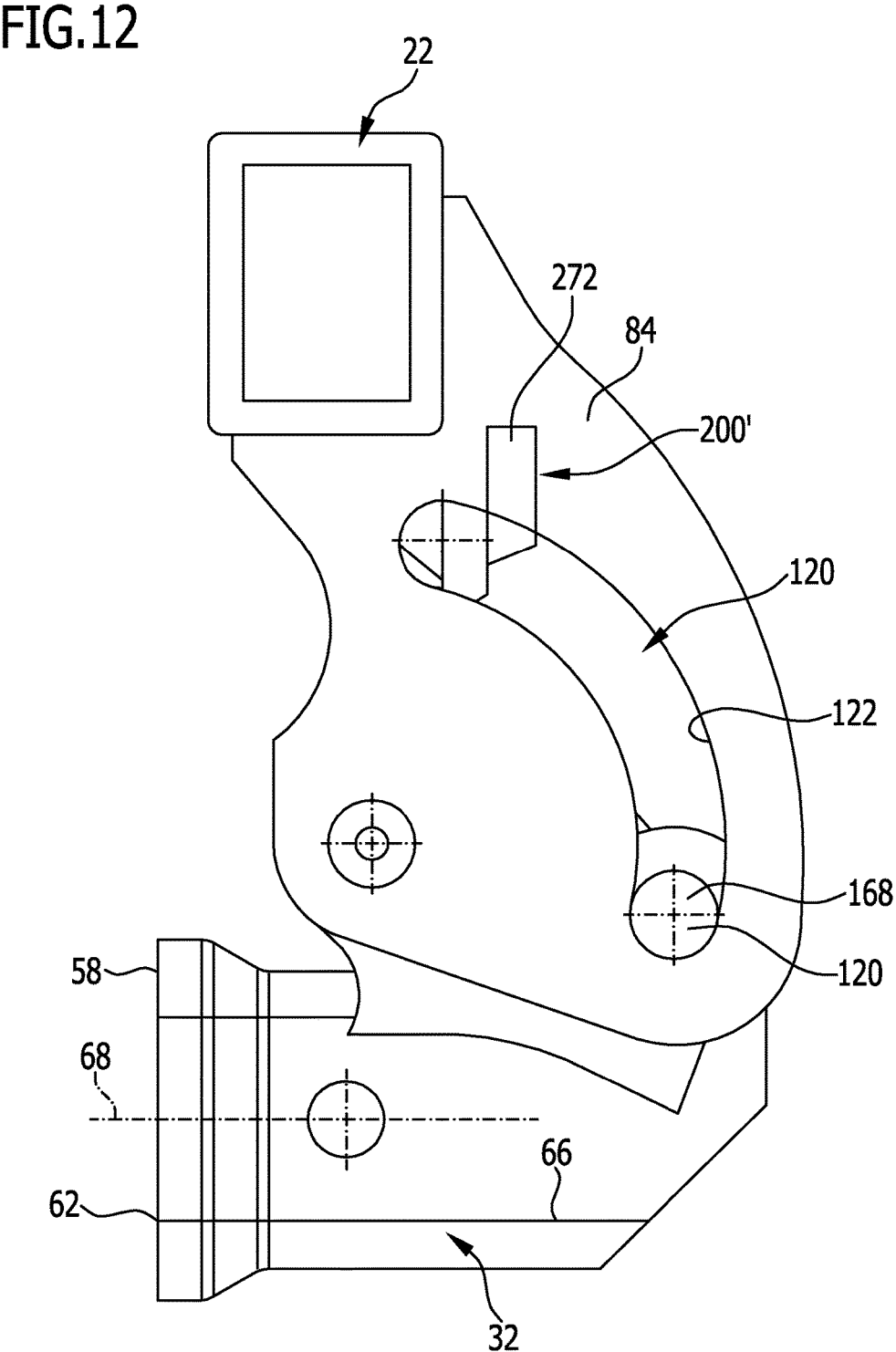
FIG. 12 is a side view of the second embodiment of the trailer coupling device according to the invention in the direction of arrow A in FIG. 7 with the ball neck receiving sleeve in the working position.

In the unlocking position, a pivoting of the ball neck receiving sleeve 32 into the rest position is then possible, as shown in FIG. 12, wherein the rest position can be reached by a pivoting about the pivot axis 112 in the same way as in the first embodiment, and also the position of the ball neck receiving sleeve 32 in the rest position is identical in the position of the ball neck receptacle as in the rest position in the first embodiment.

In connection with the present explanation of the second embodiment, the fixing of the ball neck receiving sleeve 32 in the rest position has not been described.

Figure 13:
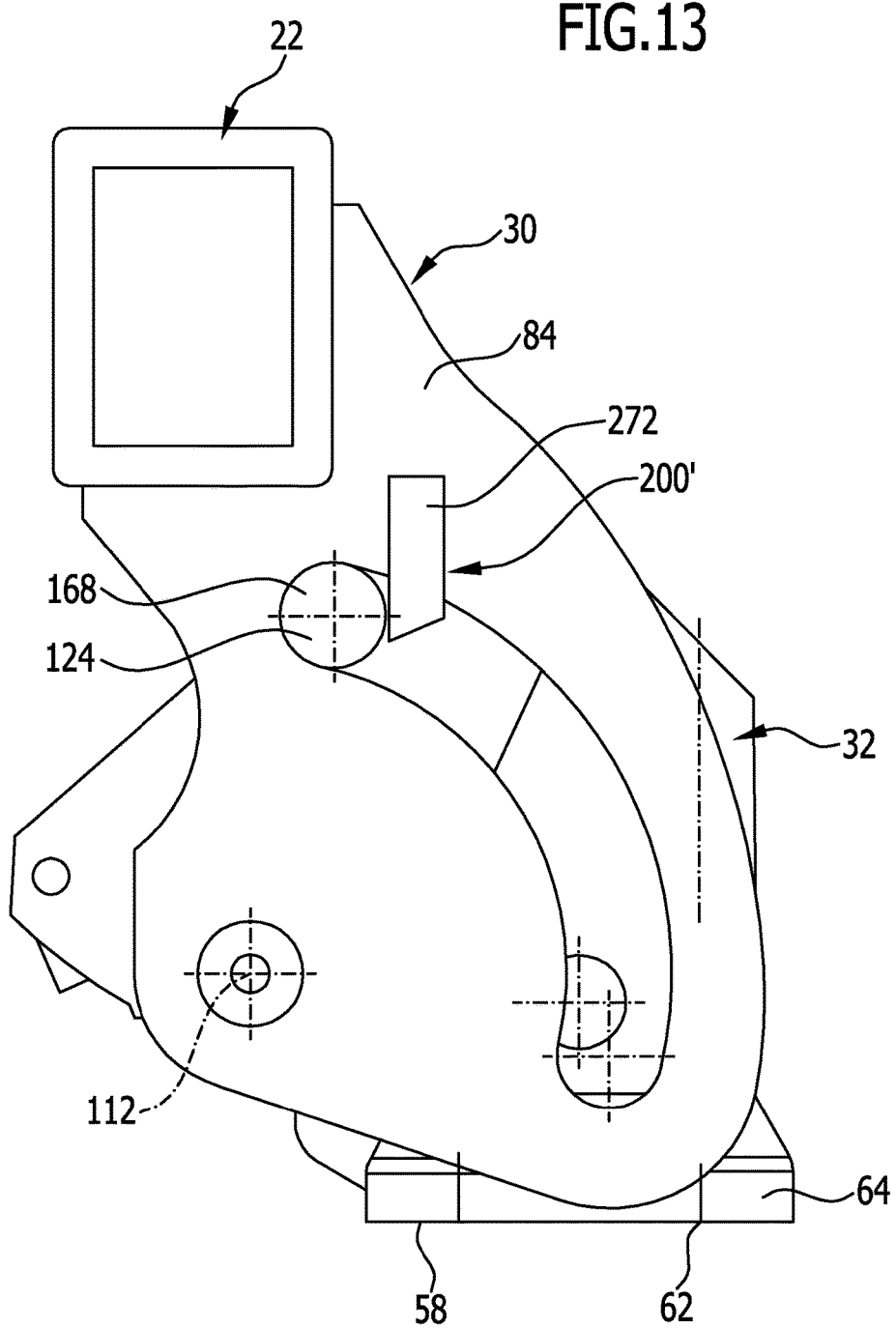
FIG. 13 is a view according to FIG. 12 of the second embodiment of the trailer coupling device according to the invention with the ball neck receiving sleeve in the rest position.

As shown in FIGS. 12 and 13, the second locking unit 200' is provided for fixing the ball neck receiving sleeve 32 in the rest position, which locking unit is associated with the side parts 82 and 84 of the supporting unit for example and is constructed as a simple latching element 272 which engages behind and fixes the latch member 168 coupled with the track runner 124 when the ball neck receiving sleeve 132 is in the rest position, wherein, by means of a suitable action upon the ball neck receiving sleeve 132, the effect of the latching element 272 can be overcome in the same way that the effect of the latching element 272 is overcome when the latch member 168 is moved from the working position shown in FIG. 12 to the rest position shown in FIG. 13.

Figure 14:
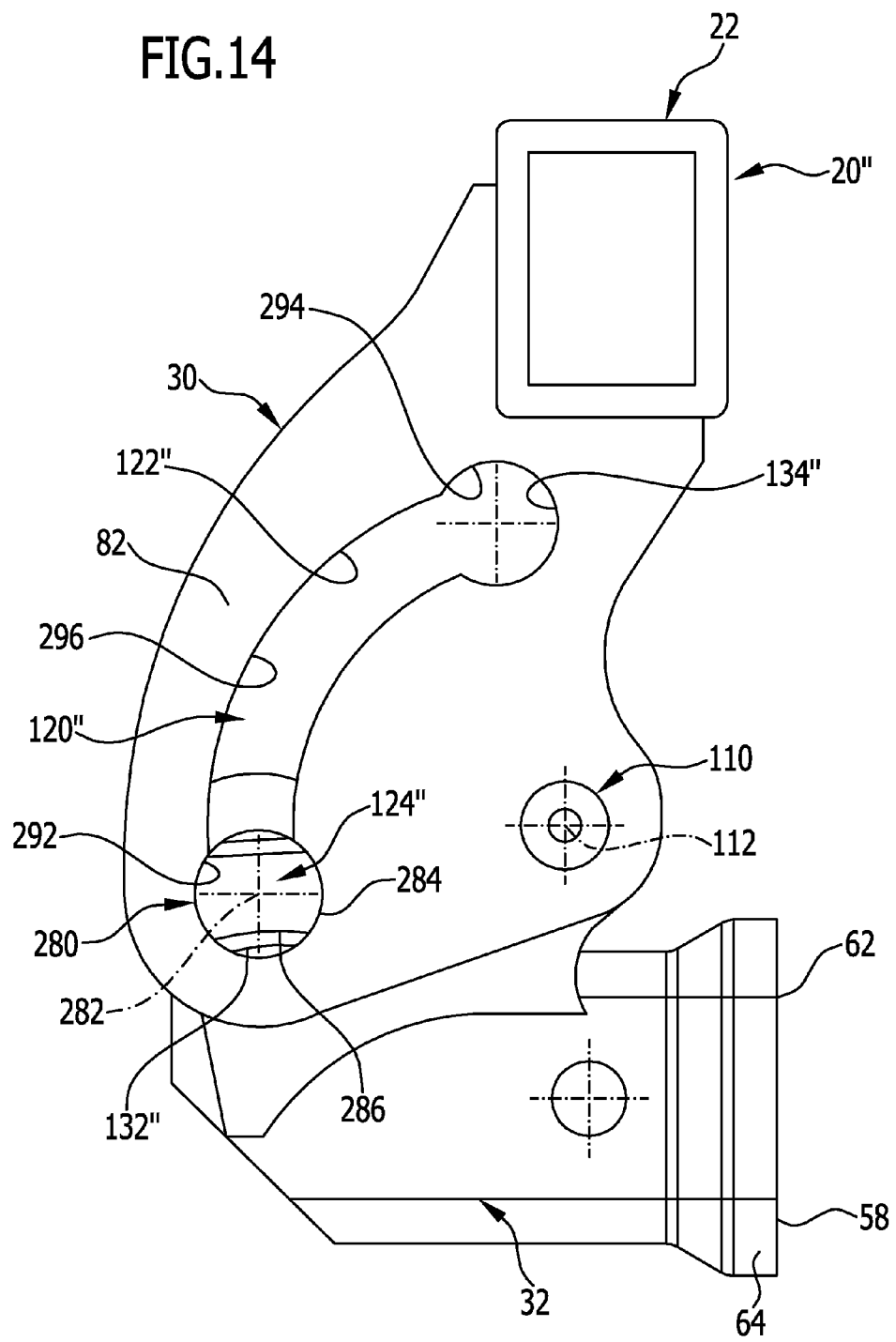
FIG. 14 is a side view of a third embodiment of a trailer coupling device according to the invention with the ball neck receiving sleeve in the working position.
Figure 15:
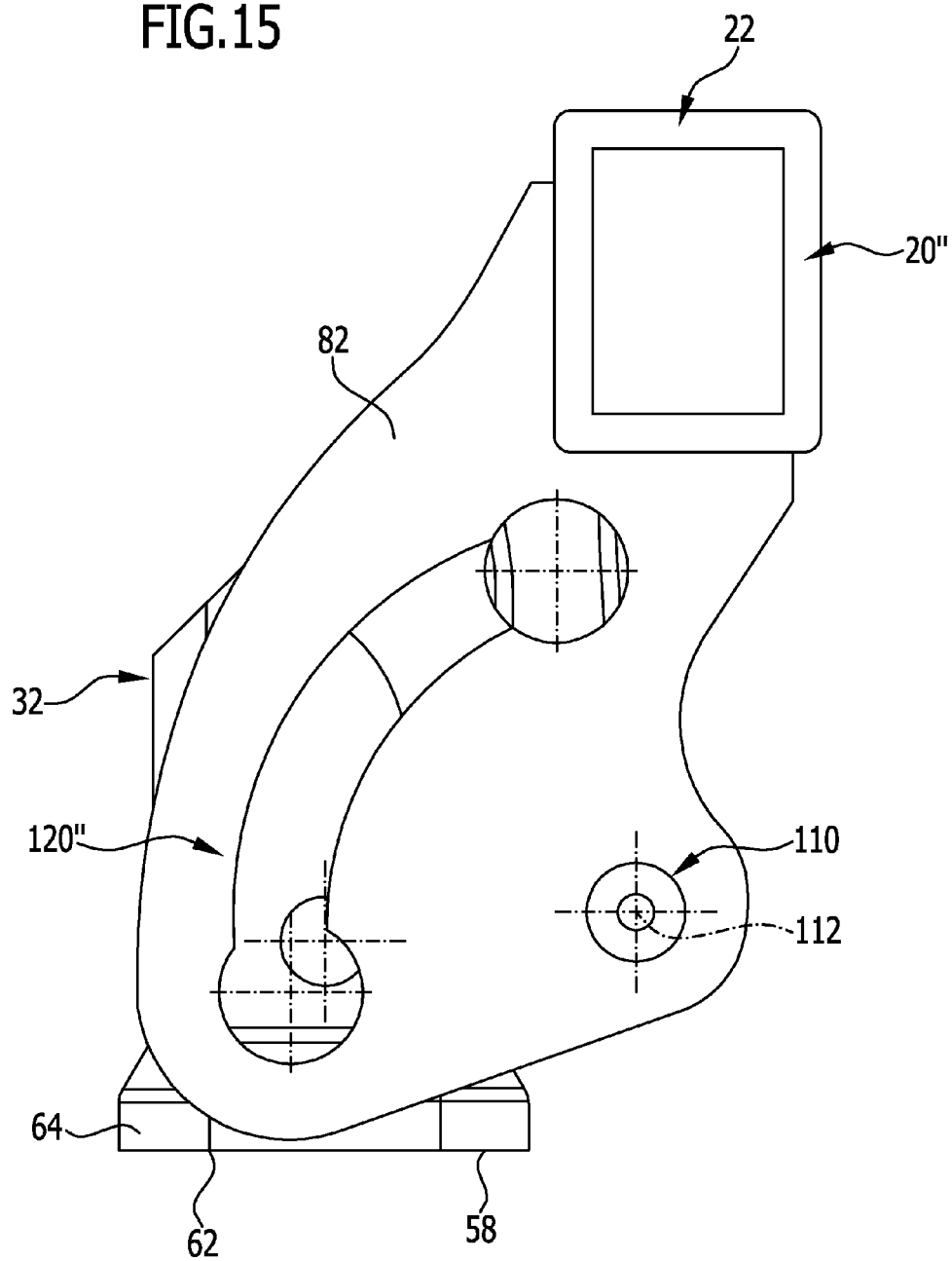
FIG. 15 is a view of the third embodiment similar to FIG. 14 with the ball neck receiving sleeve in the rest position.

In a simplified third embodiment of a trailer coupling device 20" according to the invention, the cross member 22, the supporting unit 30 with the side parts 82 and 84, as well as the pivot bearing unit 110 for pivoting the ball neck receiving sleeve 32 from the working position shown in FIG. 14 into the rest position shown in FIG. 15, are constructed identically to the above-mentioned embodiments.

In contrast to the above-mentioned embodiments, however, the pivot guide 120" is constructed such that it simultaneously comprises a locking unit 280.

This locking unit 280 is formed by a track runner 124" which is rotatable about its longitudinal axis 282 and has an outer contour 284 which is circular in portions, said outer contour merging into an outer contour formed by two parallel surfaces 286, wherein the two parallel surfaces 286 run as secants to the circular contour defining the outer contour 284.

Furthermore, in its course adjoining the end regions 132" and 134", the guide track 122" is provided with end contours 292, 294 enlarged to a circular contour, between which end contours runs a guide region 296 narrowed relative to the end contours 292, 294, said guide region then being able to be passed through by the track runner 124 when it is rotated in such a way that the surfaces 286 running parallel to one another run along the guide region 296, whereas the outer contour 284 abuts one of the end contours 292 or 294 when the track runner 124 is rotated in such a way that the surfaces 286 run transversely to the guide region 296, and the track runner 124 is fixed relative to the respective end contour 292, 294 and cannot move along the guide region 296 to the other end contour 292, 294.

Figure 16:
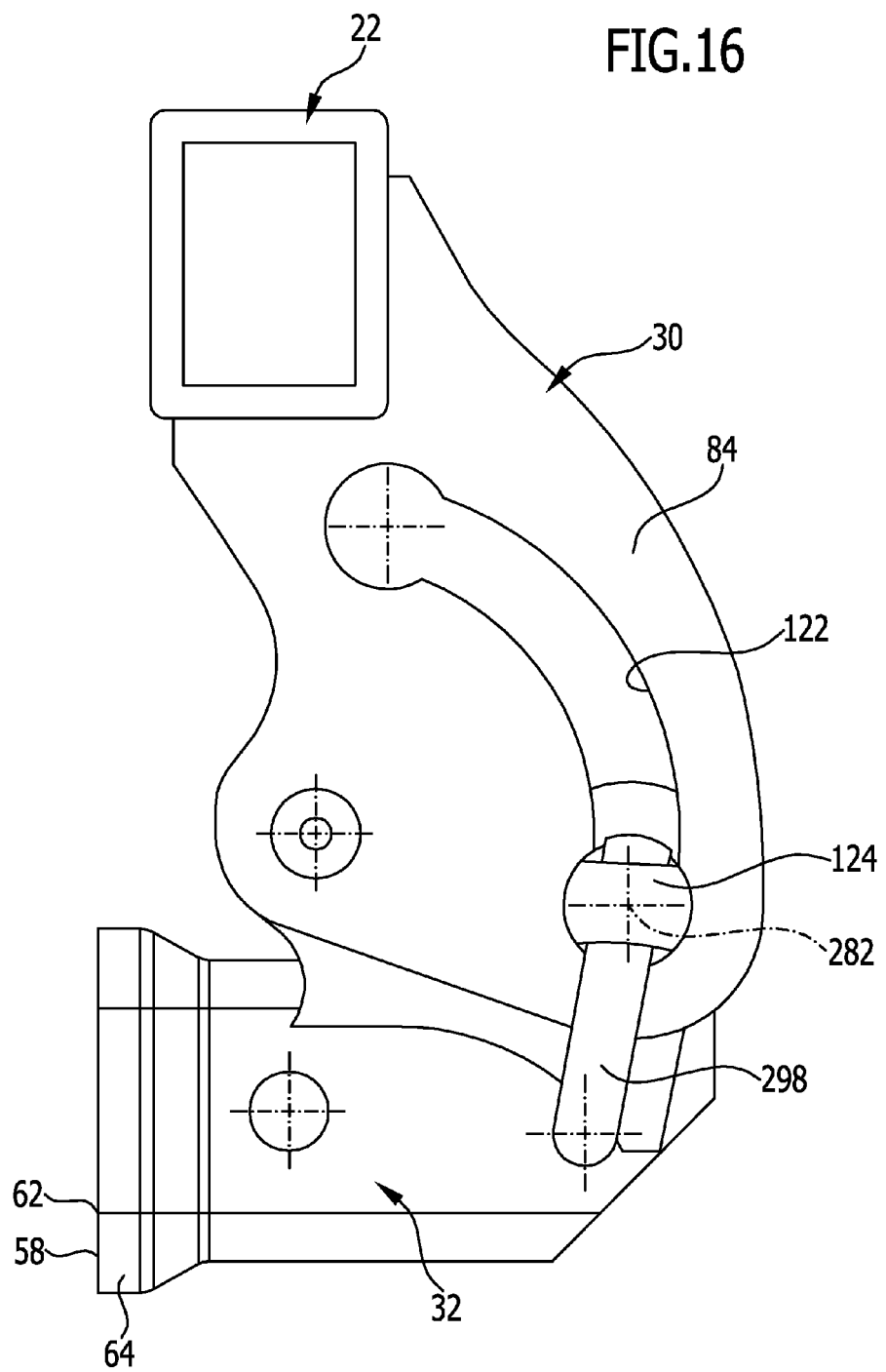
FIG. 16 is a side view similar to FIG. 14 but from the opposite side of the third embodiment of the trailer coupling device according to the invention.

As a result, by rotating the track runner 124, a locking of the track runner 124 and thus the ball neck receiving sleeve 32 both in the working position shown in FIG. 15 and in the rest position shown in FIG. 16 is already possible.

Preferably the track runner 124 is provided with an actuating handle 298 for this purpose, as shown in FIG. 16, which actuating handle enables the rotating of the track runner 124 about its longitudinal axis 282.

Figure 17:
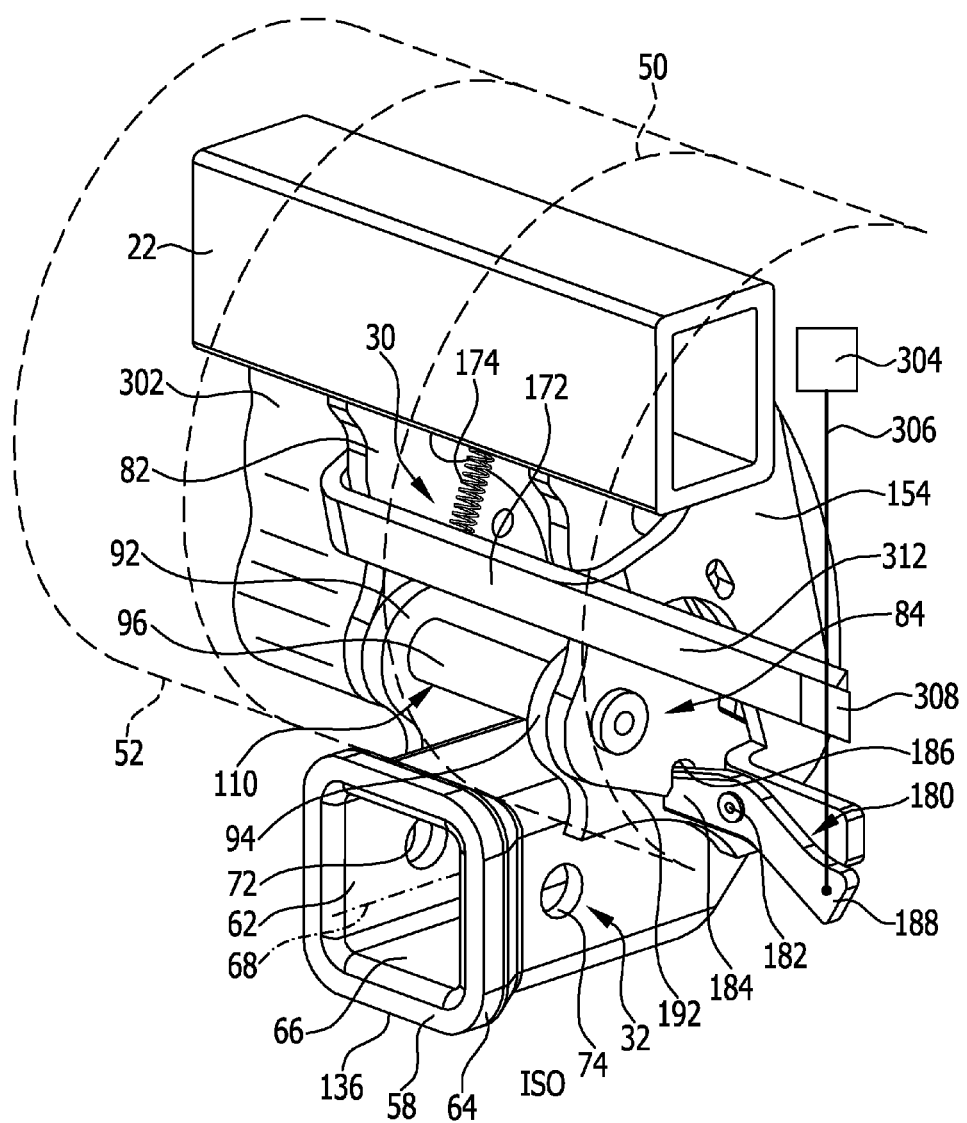
FIG. 17 is a view similar to FIG. 2 of a fourth embodiment of a trailer coupling device according to the invention.

In a fourth embodiment of the trailer coupling device according to the invention, shown in FIG. 17, the basic construction is identical to that of the first embodiment.

However, the pivot pin 96 is connected to the support elements 92 and 94 in a rotatably fixed manner and, for its part, is mounted rotatably in the side parts 82 and 84.

Thus, there is the possibility of driving the pivot pin 96 directly by means of a motor drive unit 302, and thus driven by the drive unit 302, to execute a pivoting of the ball neck receiving sleeve 32 about the pivot axis 112 between the working position and the rest position.

The drive unit 302 here is constructed for example as an electric motor with a corresponding transmission unit which applies the torque to pivot the ball neck receiving sleeve 32 between the working position and the rest position, and vice versa.

Moreover, a release unit 304 for example is provided, which, with a pulling element 306, for example a Bowden cable, is in a position to act on the operating element 188 of the safety device 180, wherein at the same time the pulling element 306 is fed through a guide 308 which is held by an extension 312 of the bracket 172.

A pull effect on the pulling element 306 now leads on the one hand to the release of the safety element 184 from the recess 186 and, after release of the safety device 180, to a tilting moment on the unit from the pivot brackets 152 and 154 coupled by the bracket 172, which leads to the pivot latches 152, 154 being tipped from the locking position into the unlocking position.

If the release unit 304 is thus also provided for example with an electric drive, there is the possibility, with the interaction of the drive unit 302, of releasing the safety device 180 in an electrically driven manner on the one hand, and at the same time of moving the first locking unit 150 and the second locking unit 200, because of their coupling, from the locking position to the unlocking position, and after moving the locking units 150 and 200 from the locking position to the unlocking position, driven by the drive unit 302, of pivoting the ball neck receiving sleeve 32 about the pivot axis 112 either from the working position into the rest position or from the rest position into the working position.

As a result, after leaving the working position or the rest position, the release unit 304 can pass again into its starting position before the following position, i.e. the rest position or the working position, is reached.

The invention claimed is:

1. A trailer coupling device for motor vehicles, comprising a rear-side cross member which is mountable on a vehicle body, a supporting unit provided on the cross member which holds a ball neck receiving sleeve having a ball neck receptacle in which a ball neck carrying a coupling ball is insertable and fixable therein, the supporting unit comprises a pivot bearing unit, by means of which the ball neck receiving sleeve is pivotable from a working position in which the ball neck is insertable therein in order to use a trailer, into a rest position with the ball neck removed, and in the rest position, an insertion opening of the ball neck receiving sleeve is facing a road surface, wherein a first locking unit is provided which fixes the ball neck receiving sleeve in the working position relative to the supporting unit, wherein a second locking unit is provided which fixes the ball neck receiving sleeve in the rest position relative to the supporting unit, wherein the first locking unit is constructed in such a way that the first locking unit is not releasable when the ball neck is inserted into the ball neck receptacle in the working position.

2. The trailer coupling device according to claim 1, wherein the first locking unit comprises two locking elements, one of which is connected to the supporting unit and one of which is connected to the ball neck receiving sleeve.

3. The trailer coupling device according to claim 2, wherein the second locking unit has at least one pivot latch which, in the locking position, abuts a latch part, which forms the first locking unit.

4. The trailer coupling device according to claim 1, wherein a safety device is provided which secures the first locking unit in the locked position.

5. The trailer coupling device according to claim 4, wherein the safety device is manually actuable.

6. The trailer coupling device according to claim 1, wherein the first locking unit is manually actuable.

7. The trailer coupling device according to claim 1, wherein a drive unit is provided, by means of which actuation of at least the first locking unit or the second locking unit occurs.

8. The trailer coupling device of claim 1, wherein the ball neck receiving sleeve receives an end of the ball neck such that the end extends into the ball neck receiving sleeve.

9. The trailer coupling device of claim 1 wherein the ball neck receiving sleeve forms a ball neck receptacle extending in said ball neck receiving sleeve starting from an insertion opening at least towards openings for a fixing bolt.

10. A trailer coupling device for motor vehicles, comprising a rear-side cross member which is mountable on a vehicle body, a supporting unit provided on the cross member which holds a ball neck receiving sleeve having a ball neck receptacle in which a ball neck carrying a coupling ball is insertable and fixable therein, the supporting unit comprises a pivot bearing unit, by means of which the ball neck receiving sleeve is pivotable from a working position in which an end of the ball neck is insertable therein in order to use a trailer, into a rest position, in which the ball neck is removed, and the ball neck receiving sleeve in the rest position is arranged in a receiving space of the supporting unit in an engaging manner, wherein a first locking unit is provided which fixes the ball neck receiving sleeve in the working position relative to the supporting unit, wherein a second locking unit is provided which fixes the ball neck receiving sleeve in the rest position relative to the supporting unit, wherein the first and second locking units are coupled to one another by a coupling device.

11. A trailer coupling device for motor vehicles, comprising a rear-side cross member which is mountable on a vehicle body, a supporting unit provided on the cross member which holds a ball neck receiving sleeve having a ball neck receptacle in which a ball neck carrying a coupling ball is insertable and fixable therein, the supporting unit comprises a pivot bearing unit, by means of which the ball neck receiving sleeve is pivotable from a working position in which the ball neck is insertable therein in order to use a trailer, into a rest position, in which the ball neck is removed, and the ball neck receiving sleeve in the rest position is arranged in a receiving space of the supporting unit in an engaging manner, wherein the ball neck receiving sleeve forms a ball neck receptacle extending in said ball neck receiving sleeve starting from an insertion opening at least towards openings for a fixing bolt, and wherein the receiving space is arranged between side parts of the supporting unit, wherein a first locking unit is provided which fixes the ball neck receiving sleeve in the working position relative to the supporting unit, wherein a second locking unit is provided which fixes the ball neck receiving sleeve in the rest position relative to the supporting unit, wherein the first and second locking units are coupled to one another by a coupling device.

12. A trailer coupling device for motor vehicles, comprising a rear-side cross member which is mountable on a vehicle body, a supporting unit provided on the cross member which holds a ball neck receiving sleeve having a ball neck receptacle in which a ball neck carrying a coupling ball is insertable and fixable therein, the supporting unit comprises a pivot bearing unit, by means of which the ball neck receiving sleeve is pivotable from a working position in which the ball neck is insertable therein in order to use a trailer, into a rest position with the ball neck removed, and in the rest position, an insertion opening of the ball neck receiving sleeve is facing a road surface;

wherein a first locking unit is provided which fixes the ball neck receiving sleeve in the working position relative to the supporting unit and a second locking unit is provided which fixes the ball neck receiving sleeve in the rest position relative to the supporting unit; and wherein the first locking unit and the second locking unit are coupled by means of a coupling device, such that, by actuating the first locking unit to release the first locking unit, the second locking unit is also actuable to be released.

13. A trailer coupling device for motor vehicles, comprising a rear-side cross member which is mountable on a vehicle body, a supporting unit provided on the cross member which holds a ball neck receiving sleeve having a ball neck receptacle in which a ball neck carrying a coupling ball is insertable and fixable therein, the supporting unit comprises a pivot bearing unit, by means of which the ball neck receiving sleeve is pivotable from a working position in which the ball neck is insertable therein in order to use a trailer, into a rest position with the ball neck removed, and in the rest position, an insertion opening of the ball neck receiving sleeve is facing a road surface;

wherein a first locking unit is provided which fixes the ball neck receiving sleeve in the working position relative to the supporting unit; and wherein the first locking unit is constructed in such a way that the first locking unit is not releasable when the ball neck is inserted into the ball neck receptacle in the working position, and holds the ball neck receiving sleeve fixedly in the working position, and in that the first locking unit is releasable when the ball neck is removed from the ball neck receptacle.

* * * * *